(12) United States Patent
Reznar

(10) Patent No.: US 7,413,171 B2
(45) Date of Patent: Aug. 19, 2008

(54) SPARE TIRE CARRIER WITH CABLE GUIDE

(75) Inventor: Jason Reznar, Redford, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 362 days.

(21) Appl. No.: 11/094,774

(22) Filed: Mar. 30, 2005

(65) Prior Publication Data

US 2006/0226405 A1    Oct. 12, 2006

(51) Int. Cl.
*B66B 1/00* (2006.01)
*B65H 3/04* (2006.01)

(52) U.S. Cl. .................................. 254/323; 242/615.3

(58) Field of Classification Search ......... 354/323–325, 354/378; 242/615.3, 613.3; 254/323–325, 254/378; 414/463, 466
See application file for complete search history.

(56) References Cited

U.S. PATENT DOCUMENTS

| | | | |
|---|---|---|---|
| 3,539,152 A * | 11/1970 | Paul | 254/323 |
| 5,100,106 A * | 3/1992 | Denman et al. | 254/323 |
| 6,267,546 B1 | 7/2001 | Oxyer et al. | |
| 6,427,981 B1 | 8/2002 | Kingsbury et al. | |
| 6,443,846 B1 | 9/2002 | Dziedzic et al. | |
| 6,499,724 B1 * | 12/2002 | Dobmeier et al. | 254/323 |
| 6,692,216 B2 | 2/2004 | Reznar et al. | |
| 6,960,047 B2 * | 11/2005 | Knezek et al. | 405/211 |
| 2007/0063174 A1 * | 3/2007 | Sauner et al. | 254/323 |

\* cited by examiner

*Primary Examiner*—Evan H Langdon
(74) *Attorney, Agent, or Firm*—Gregory Cohan; Banner & Witcoff, Ltd.; Dean B. Watson

(57) ABSTRACT

A spare tire carrier assembly for a vehicle includes a housing having an aperture formed therein and a spool positioned in the housing. A drive shaft is connected to the spool, and a cable is wrapped about the spool. A cable guide assembly extends through the aperture and has a first portion positioned in the housing and a second portion positioned outside the housing. The first portion has an aperture extending therethrough. The second portion has an aperture extending therethrough that is in communication with the aperture in the first portion. The cable extends through the aperture in the first portion and the aperture in the second portion.

23 Claims, 4 Drawing Sheets

SPARE TIRE CARRIER WITH CABLE GUIDE

FIELD OF THE INVENTION

This invention relates generally to a spare tire carrier for a vehicle, and, in particular, to a spare tire carrier for a vehicle having an improved cable guide.

BACKGROUND OF THE INVENTION

Many motor vehicles are known to have a tire carrier that mounts the vehicle's spare tire beneath the vehicle, such as beneath the passenger compartment or trunk of a passenger car or beneath the bed of a truck. A spare tire carrier assembly typically includes a housing that is mounted to the vehicle. A sheave or spool is positioned in the housing, and a cable is wound about the spool, with a free end of the cable extending out of the housing and connected to the spare tire, retaining it in position beneath the vehicle until it is needed. To release and secure the tire to the vehicle, a shaft on the tire carrier is rotated from above. With the spare tire carrier assembly located underneath the vehicle it is naturally subject to dirt and debris, which can create problems with the operation of the spool.

It is an object of the present invention to provide a spare tire carrier assembly that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a spare tire carrier assembly with a cable guide construction that helps protect the assembly from the elements. In accordance with a first preferred embodiment, a spare tire carrier assembly for a vehicle includes a housing having an aperture formed therein and a spool positioned in the housing. A drive shaft is connected to the spool, and a cable is wrapped about the spool. A cable guide assembly extends through the aperture and has a first portion positioned in the housing and a second portion positioned outside the housing. The first portion has an aperture extending therethrough. The second portion has an aperture extending therethrough that is in communication with the aperture in the first portion. The cable extends through the aperture in the first portion and the aperture in the second portion.

In accordance with another preferred embodiment, a spare tire carrier assembly for a vehicle includes a mounting bracket configured to be secured to a vehicle. A housing is secured to the mounting bracket and has an aperture formed therein. A spool is positioned in the housing, and a drive shaft is connected to the spool. A drive member is operably connected to the drive shaft.

A cable is wrapped about the spool and extends through the aperture in the housing. A cable guide assembly extends through the aperture and has a first portion positioned in the housing and a second portion positioned on an exterior of the housing. The first portion has an aperture extending therethrough. The second portion has an aperture extending therethrough that is n fluid communication with the aperture in the first portion. The cable extends through the aperture in the first portion and the aperture in the second portion. A portion of the second portion is in contact with the mounting bracket. The aperture in the second portion opens in a direction of travel of the cable out of the cable guide assembly.

In accordance with a further embodiment, a spare tire carrier assembly for a vehicle includes a mounting bracket configured to be secured to a vehicle. A housing is secured to the mounting bracket and has an aperture formed therein. A spool is positioned in the housing, and a drive shaft is connected to the spool. A drive member is operably connected to the drive shaft. A cable is wrapped about the spool and extends through the aperture in the housing. A cable guide assembly extends through the aperture and has a first portion positioned in the housing, which has an aperture extending therethrough and a guide surface to guide the cable toward the spool. A second portion is positioned on an exterior of the housing and has an aperture extending therethrough. The aperture in the second portion is in fluid communication with the aperture in the first portion. The cable extends through the aperture in the first portion and the aperture in the second portion. A portion of the second portion is in contact with the mounting bracket. The aperture in the second portion opens in a direction of travel of the cable out of the cable guide assembly.

Substantial advantage is achieved by providing a spare tire carrier assembly with a cable guide.

In particular, certain preferred embodiments of the present invention reduce the introduction of dirt and debris into the operating mechanism of the assembly, thereby reducing the chance of failure of the assembly and improving its reliability and performance.

These and additional features and advantages of the invention disclosed here will be further understood from the following detailed disclosure of certain preferred embodiments.

Figure 1:
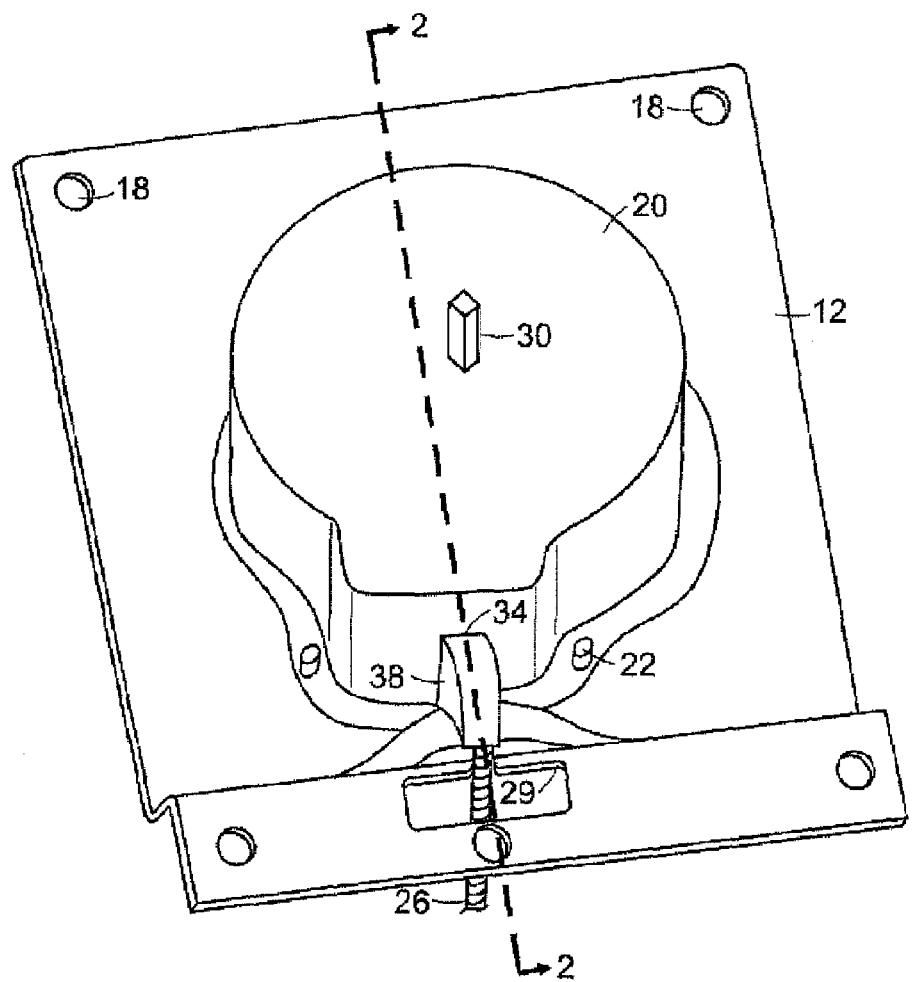
FIG. 1 is a perspective view of a spare tire carrier assembly in accordance with a preferred embodiment of the present invention.

The figures referred to above are not drawn necessarily to scale and should be understood to provide a representation of the invention, illustrative of the principles involved. Some features of the spare tire carrier assembly guide depicted in the drawings have been enlarged or distorted relative to others to facilitate explanation and understanding. The same reference numbers are used in the drawings for similar or identical components and features shown in various alternative embodiments. Spare tire carrier assemblies as disclosed herein would have configurations and components determined, in part, by the intended application and environment in which they are used.

DETAILED DESCRIPTION OF CERTAIN PREFERRED EMBODIMENTS

Figure 2:
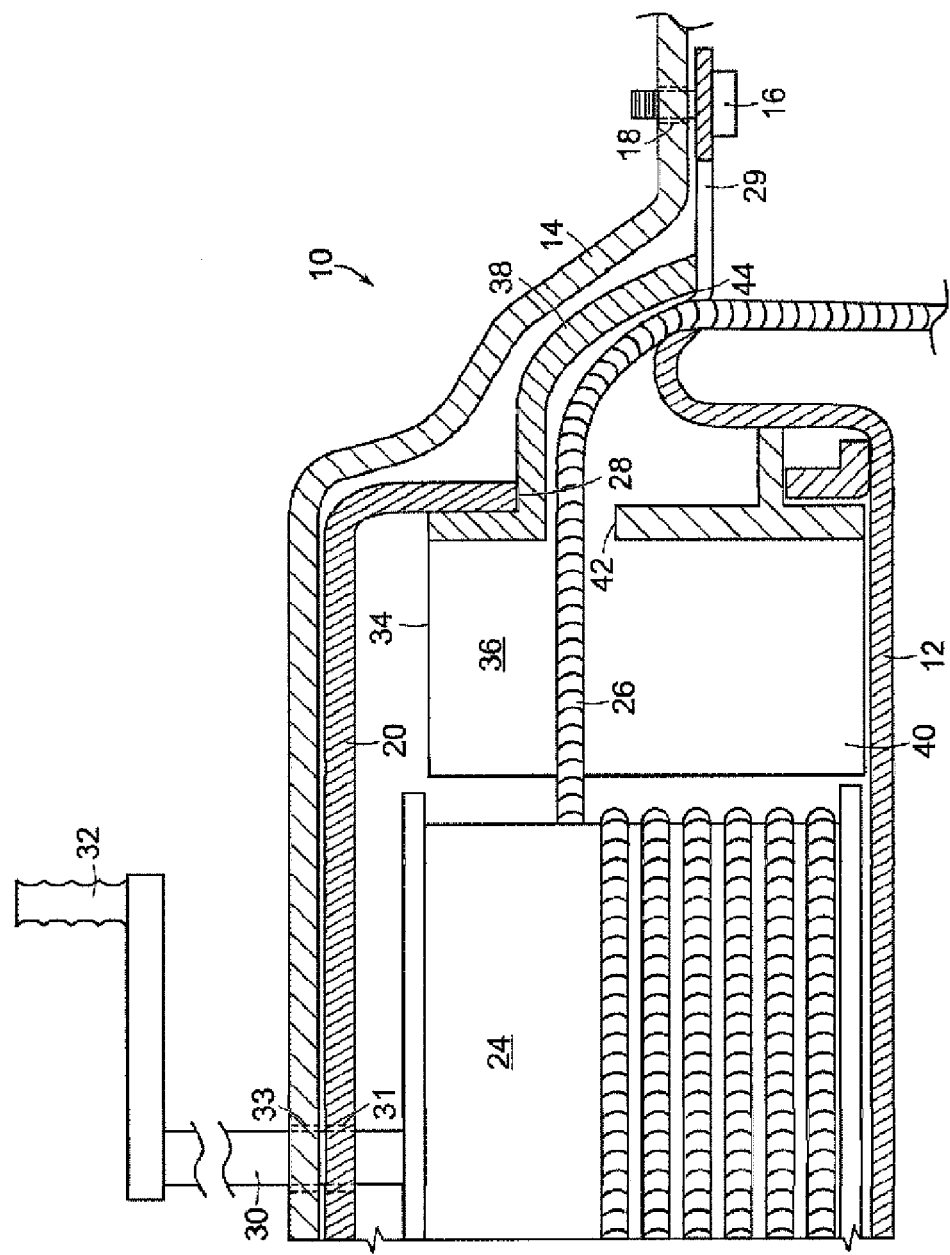
FIG. 2 is a section view of the spare tire carrier assembly of FIG. 1, taken along line 2-2 of FIG. 1.
Figure 3:
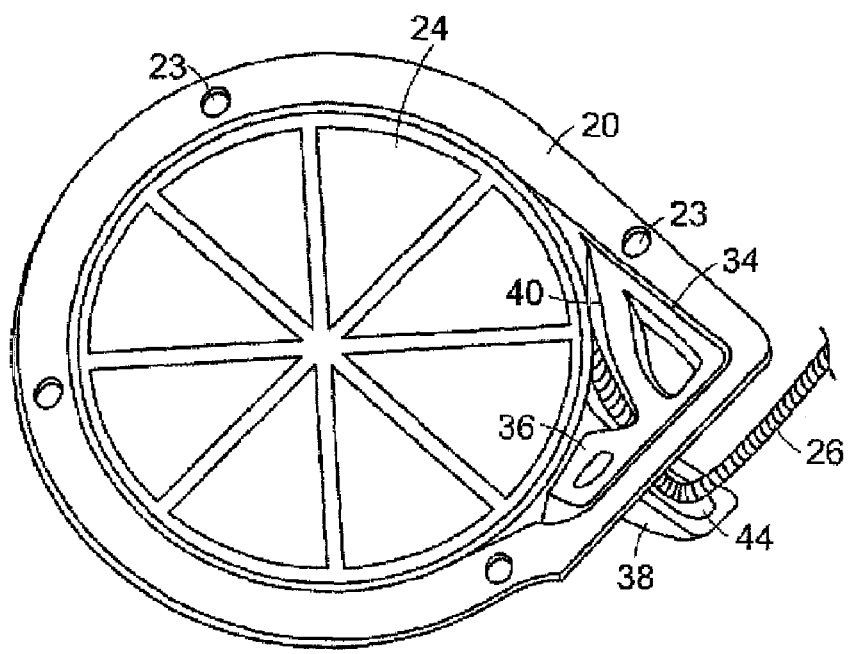
FIG. 3 is a perspective view of the underside of the housing of the spare tire carrier assembly of FIG. 1, shown with the cable guide and cable in place.

The present invention may be embodied in various forms. A first embodiment of a spare tire carrier assembly 10 is shown in FIGS. 1-3. Spare tire carrier assembly 10 includes a mounting bracket 12 secured to a portion of a vehicle such as a floor pan 14. As illustrated here, mounting bracket 12 is secured to floor pan 14 with fasteners such as bolts 16 that extend through apertures 18 formed in mounting bracket 12. It is to be appreciated that mounting bracket 12 can be secured to floor pan 14 with other types of fasteners, and that mounting bracket 12 may have any desired shape. It is also to be appreciated that spare tire carrier assembly 10 can be secured to a vehicle in any desired location. For example, spare tire carrier assembly 10 may be secured beneath the bed of a pickup, beneath the trunk of a vehicle, beneath the passenger compartment of a vehicle, beneath a trailer or in any other desired location.

A housing 20 of spare tire carrier assembly 10 is secured to mounting bracket 12. As illustrated here, housing 20 is secured with fasteners such as bolts 22 that extend through apertures 23 formed in housing 20. It is to be appreciated that housing 20 can be secured to mounting bracket 12 with any type of fastener, and other suitable fasteners will become readily apparent to those skilled in the art, given the benefit of this disclosure.

A sheave or spool 24 is rotatably positioned in housing 20. A cable 26 is wound about spool 24 and extends through an aperture 28 in housing 20 and an aperture 29 in mounting bracket 12. As illustrated here, cable 26 winds about spool 24 in a non-overlapping fashion. It is to be appreciated that in other embodiments spool 24 may be narrower, causing cable 26 to wind about itself in overlapping fashion around spool 24. An end of cable 26 is secured to a spare tire (not shown) and retains the spare tire in position beneath the vehicle in known fashion until it is needed.

A drive shaft 30 extends outwardly from spool 24 through an aperture 31 in housing 20 and an aperture 33 in floor pan 14. As illustrated here, drive shaft 30 has a square cross-section. However, it is to be appreciated that drive shaft 30 can have any desired cross-sectional shape. A drive member such as a handle 32 is secured to an end of drive shaft 30 and allows a user to rotate spool 24, thereby winding or unwinding cable 26 to raise or lower the spare tire as needed. It is to be appreciated that in certain embodiments, an electrically actuated drive member could be used in place of the manual handle 32 illustrated here.

A cable guide assembly 34 extends through aperture 28 in housing 20 and has a first portion 36 positioned within housing 20 and a second portion 38 positioned on the exterior of housing 20. As illustrated here, second portion 38 extends through aperture 28 in housing 20, although it is to be appreciated that in other embodiments, first portion 36 of cable guide assembly 34 may extend through aperture 28. In certain embodiments, cable guide assembly 34 is of unitary, that is, one piece construction. In other embodiments, first portion 36 and second portion 38 can be formed as separate elements that are secured to one another. For example, second portion 38 may be overmolded onto first portion 36.

First portion 36 of cable guide assembly 34 has a guide surface 40 that serves to guide cable 26 as it enters housing 20 and is wound about spool 24. In one embodiment, guide surface 40 is curved so as to facilitate the wrapping of cable 26 about spool 24.

An aperture 42 extends through first portion 36 and is in fluid communication with an aperture 44 formed in second portion 38. Cable 26 extends through apertures 42, 44 of first portion 36 and second portion 38, respectively, and then through aperture 29 of mounting bracket 12 to the spare tire. Aperture 44 of second portion 38 preferably opens in a direction of travel of cable 26 out of cable guide assembly 34. At least a portion of the peripheral edge of aperture 44 preferably contacts mounting bracket 12, thereby helping ensure a seal between second portion 38 and mounting bracket 12. Second portion 38 serves to reduce the tendency of dirt and debris from entering housing 20 through aperture 28 in housing 20, thereby improving the performance and reliability of spare tire carrier assembly 10.

In one embodiment, first portion 36 and second portion 38 are formed of a mineral filled nylon. A coating may, e.g., polyurethane, may be formed on second portion 38, allowing second portion 38 to be compressed onto mounting bracket 12, thereby helping to provide the seal between second portion 38 and mounting bracket 12.

Figure 4:
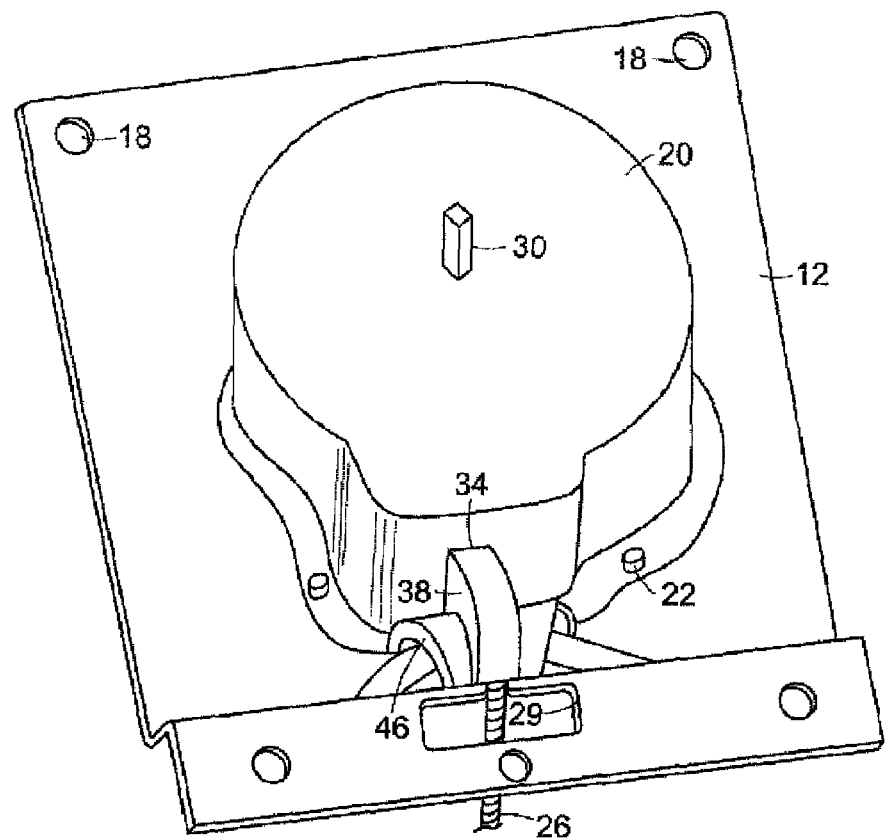
FIG. 4 is a perspective view of a spare tire carrier assembly in accordance with an alternative embodiment of the present invention.

In another embodiment, illustrated in FIG. 4, a sealing member 46 is positioned between second portion 38 and mounting bracket 12, further ensuring a good seal between second portion 38 and mounting bracket 12. Sealing member 46 may be formed of a foam material, or any other material suitable for providing a good seal between second portion 38 and mounting bracket 12.

As illustrated in FIG. 2, spare tire carrier assembly 10 is mounted within a vehicle such that mounting bracket 12 and housing 20 are oriented substantially horizontally and drive shaft 30 extends substantially vertically. It is to be appreciated that in other embodiments, mounting bracket 12 and housing 20 could be oriented substantially vertically, with drive shaft 30 extending substantially horizontally. In such an embodiment, drive shaft 30 could extend out through the bumper of the vehicle, for example. Other orientations of spare tire carrier assembly 10 will become readily apparent to those skilled in the art, given the benefit of this disclosure.

In light of the foregoing disclosure of the invention and description of certain preferred embodiments, those skilled in this area of technology will readily understand that various modifications and adaptations can be made without departing from the scope and spirit of the invention. All such modifications and adaptations are intended to be covered by the following claims.

What is claimed is:

1. A spare tire carrier assembly for a vehicle comprising, in combination:
    a housing having an aperture formed therein;
    a spool positioned in the housing;
    a drive shaft connected to the spool;
    a cable wrapped about the spool;
    a cable guide assembly extending through the aperture and having a first portion positioned in the housing and a second portion positioned outside the housing, the first portion having an aperture extending therethrough the second portion having an aperture extending therethrough and in fluid communication with the aperture in the first portion, wherein the cable extends from the spool and through the aperture in the first portion in a first plane, and out of the cable guide assembly through the aperture in the second portion in a second plane that is not parallel to the first plane.

2. The spare tire carrier assembly of claim 1, wherein the first portion includes a guide surface to guide the cable about the spool.

3. The spare tire carrier assembly of claim 2, wherein the guide surface is curved.

4. The spare tire carrier assembly of claim 1, wherein the cable guide assembly is formed of a mineral filled nylon.

5. The spare tire carrier assembly of claim 1, wherein the second portion includes an exterior coating.

6. The spare tire carrier assembly of claim 5, wherein the exterior coating is formed of polyurethane.

7. The spare tire carrier assembly of claim 1, further comprising a mounting bracket to which the housing is secured.

8. The spare tire carrier assembly of claim 7, further comprising a sealing member positioned between the second portion and the mounting bracket.

9. The spare tire carrier assembly of claim 1, wherein the first portion and the second portion are of unitary construction.

10. The spare tire carrier assembly of claim 1, wherein the second portion is overmolded on the first portion.

11. The spare tire carrier assembly of claim 1, further comprising a drive member operably connected to the drive shaft.

12. The spare tire carrier assembly of claim 1, wherein the drive member comprises a handle.

13. The spare tire carrier assembly of claim 1, wherein the second portion has a shape that is curved to reduce the introduction of dirt and debris into the housing.

14. The spare tire carrier assembly of claim 1, wherein the second plane is substantially perpendicular to the first plane.

15. The spare tire carrier assembly of claim 1, wherein the first plane extends substantially horizontally and the second plane extends substantially vertically.

16. A spare tire carrier assembly for a vehicle comprising, in combination:
a mounting bracket configured to be secured to a vehicle and having an aperture extending therethrough;
a housing secured to the mounting bracket and having an aperture formed therein;
a spool positioned in the housing;
a drive shaft connected to the spool;
a drive member operably connected to the drive shaft;
a cable wrapped about the spool and extending through the aperture in the housing;
a cable guide assembly extending through the aperture and having a first portion positioned in the housing and a second portion, the first portion having an aperture extending therethrough and the second portion having an aperture extending therethrough and in communication with the aperture in the first portion, and a surface to guide the cable through the aperture in the mounting bracket, wherein the cable extends from the spool and through the aperture in the first portion in a first plane, and out of the cable guide assembly through the aperture in the second portion in a second plane that is not parallel to the first plane;
wherein a portion of the second portion is in contact with the mounting bracket and the aperture in the second portion opens in a direction of travel of the cable out of the cable guide assembly.

17. The spare tire carrier assembly of claim 16, wherein the mounting bracket includes an aperture through which the cable extends.

18. The spare tire carrier assembly of claim 16, wherein the first portion includes a guide surface to guide the cable about the spool.

19. The spare tire carrier assembly of claim 18, wherein the guide surface is curved.

20. The spare tire carrier assembly of claim 16, further comprising a sealing member positioned between the second portion and the mounting bracket.

21. The spare tire carrier assembly of claim 16, wherein the drive member comprises a handle.

22. The spare tire carrier assembly of claim 21, further comprising a sealing member positioned between the second portion and the mounting bracket.

23. A spare tire carrier assembly for a vehicle comprising, in combination:
a mounting bracket configured to be secured to a vehicle and having an aperture extending therethrough;
a housing secured to the mounting bracket and having an aperture formed therein;
a spool positioned in the housing;
a drive shaft connected to the spool;
a drive member operably connected to the drive shaft;
a cable wrapped about the spool and extending through the aperture in the housing; and
a cable guide assembly extending through the aperture and having:
a first portion positioned in the housing and having an aperture extending therethrough and a guide surface to guide the cable toward the spool; and
a second portion positioned on an exterior of the housing and having an aperture extending therethrough, the aperture in the second portion in fluid communication with the aperture in the first portion, and a surface to guide the cable through the aperture in the mounting bracket, the cable extending from the spool and through the aperture in the first portion in a first plane, and out of the cable guide assembly through the aperture in the second portion in a second plane that is not parallel to the first plane, a portion of the second portion being in contact with the mounting bracket, wherein the aperture in the second portion opens in a direction of travel of the cable out of the cable guide assembly.

* * * * *